United States Patent
Brocheton

(10) Patent No.: US 9,145,330 B2
(45) Date of Patent: Sep. 29, 2015

(54) PHOTOCHROMIC GLASSES

(71) Applicant: Corning Incorporated, Corning, NY (US)

(72) Inventor: Yves Andre Henri Brocheton, Samoreau (FR)

(73) Assignee: Corning Incorporated, Corning, NY (US)

( * ) Notice: Subject to any disclaimer, the term of this patent is extended or adjusted under 35 U.S.C. 154(b) by 73 days.

(21) Appl. No.: 14/071,851

(22) Filed: Nov. 5, 2013

(65) Prior Publication Data

US 2014/0151613 A1 Jun. 5, 2014

Related U.S. Application Data

(60) Provisional application No. 61/731,952, filed on Nov. 30, 2012.

(51) Int. Cl.
*C03C 3/093* (2006.01)
*C03C 4/06* (2006.01)
*C03C 3/097* (2006.01)

(52) U.S. Cl.
CPC ................ *C03C 3/093* (2013.01); *C03C 3/097* (2013.01); *C03C 4/06* (2013.01)

(58) Field of Classification Search
CPC ............ C03C 3/093; C03C 4/04; C03C 4/06; C03C 3/097
See application file for complete search history.

(56) References Cited

U.S. PATENT DOCUMENTS

| 4,001,019 | A | | 1/1977 | Yamashita et al. ............... 106/54 |
| 4,190,451 | A | * | 2/1980 | Hares et al. ...................... 501/13 |
| 4,240,836 | A | * | 12/1980 | Borrelli et al. ................... 501/13 |
| 4,284,686 | A | * | 8/1981 | Wedding ....................... 428/334 |
| 4,550,087 | A | * | 10/1985 | Kerko et al. ..................... 501/13 |
| 5,534,041 | A | * | 7/1996 | Havens et al. ................. 65/30.1 |

FOREIGN PATENT DOCUMENTS

| EP | 0422514 | 4/1991 |
| EP | 0673893 | 9/1999 |
| WO | 98/33747 | 8/1998 |

* cited by examiner

*Primary Examiner* — Anthony J Green
*Assistant Examiner* — Elizabeth A Bolden
(74) *Attorney, Agent, or Firm* — Kevin L. Bray

(57) ABSTRACT

Described herein are photochromic glasses that are at least substantially free of rare earth elements. Methods of making and using the photochromic glasses are also described.

7 Claims, No Drawings

PHOTOCHROMIC GLASSES

CROSS REFERENCE TO RELATED APPLICATIONS

The application claims the benefit of priority of U.S. Provisional Application Ser. No. 61/731,952 filed on 30 Nov. 2012 the contents of which are relied upon and incorporated herein by reference in their entirety as if fully set forth below.

TECHNICAL FIELD

The present disclosure relates generally to photochromic glasses. More particularly, the various embodiments described herein relate to photochromic glasses for use in ophthalmic applications that are at least substantially free of rare earth oxides, as well as to methods of making and using the photochromic glasses.

BACKGROUND

Many versions of photochromic glasses have been developed. Among all the attributes, the following are considered commercially important: low residual coloration in the clear state, color and transmission in the darkened state, ability to brighten reversibly (fading rate), and low thermal dependence, among others. In addition, some physical properties such as refractive index, coefficient of thermal expansion, Littleton temperature, and high temperature of crystallization are also desirable for manufacturing reasons.

French Patent Application 97/01164 describes improved photochromic glasses, for which composition range has been selected to optimize the above set of photochromic and physical attributes. These glasses are now commercially available, especially in countries where the weather is hot, offering attractive performances such as low thermal dependence and rapid fading. However, to obtain the required properties, these glasses include rare earth oxides (especially lanthanum oxide) to achieve a corrected refractive index without drastically impacting the photochromic properties.

Due to the recent huge increase of the cost of the raw materials and especially of those of the rare earth oxides, it is desirable to develop rare earth-free photochromic glasses presenting the same optical properties. In order to achieve this goal, rare earth oxides need to be replaced by other constituents.

It is to the provision of such technologies that the present disclosure is directed.

BRIEF SUMMARY

Described herein are various photochromic glasses and methods of making and using the photochromic glasses.

The photochromic glasses are at least substantially free of rare earth elements and include, a glass matrix, comprising in weight percent (wt %) based on oxides:
48 wt %≤$SiO_2$≤58 wt %;
15 wt %≤$B_2O_3$≤21 wt %;
5 wt %≤$Al_2O_3$≤9 wt %;
2.5 wt %≤$ZrO_2$≤6.5 wt %;
2 wt %≤$Li_2O$≤4 wt %;
0 wt %≤$Na_2O$≤3 wt %;
3 wt %≤$K_2O$≤10 wt %;
0 wt %≤MgO≤2 wt %;
0 wt %≤CaO≤2 wt %;
0 wt %≤SrO≤2 wt %;
0 wt %≤BaO≤2 wt %;
0 wt %≤$TiO_2$≤2.5 wt %;
2 wt %≤$Nb_2O_5$≤4.5 wt %; and
a plurality of photochromic agents, comprising in weight percent (wt %) with respect to the glass matrix:
0.100 wt %≤Ag≤0.250 wt %;
0.200 wt %≤Cl≤0.500 wt %;
0.0100 wt %≤Br≤0.300 wt %; and
0.0050 wt %≤CuO≤0.0110 wt %.

The plurality of photochromic agents can further include an optional reducing agent, which can be $Sb_2O_3$ and/or $SnO_2$, in an amount up to about 0.5 wt %.

The photochromic glasses are capable of exhibiting at least one of the following properties:
a transmission in the clear state $T_0$>86%;
transmission in the darkened state after a 15 minute exposure to a solar simulator at 22° C. ($T_{d15\_22C}$)<35%;
transmission in the darkened state after a 15 minute exposure to a solar simulator at 35° C. ($T_{d15\_35C}$)<45%; or
fast fading characterized by a transmission $T_{f5}$ (5 minutes after UV extinction)>45%.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

The glasses described herein generally exhibit little-to-no coloration and a high transmission in the clear state (i.e., when outside the presence of actinic radiation), coloration and low transmission in the darkened state (i.e., when actively exposed to actinic radiation), and the ability to quickly and reversibly fade or transition from the darkened state to the clear state when no longer exposed to actinic radiation. It is noted that the transmission level is minimally affected by the temperature at which the glasses are maintained when exposed to the source of actinic radiation. In addition, these glasses are at least substantially free of rare earth elements. As used herein, the term "at least substantially free of rare earth elements" means that no rare earth element (i.e., any of the lanthanide elements, actinide elements, scandium, and yttrium) is intentionally added, in any format, to the glass or glass raw materials during any of the processing steps leading to the formation of the glass article. It is to be understood that a glass composition or glass article that is at least substantially free of a rare earth element may inadvertently contain small amounts of a rare earth element (whether in elemental, ionic, or compound form) due to contamination or it may contain no amounts of that component.

In addition, in certain embodiments, the glasses described herein are at least substantially free of alkaline-earth oxides, such materials can greatly influence the ability of the glasses to fade. As used herein, the term "at least substantially free of alkaline-earth oxides" means that no alkaline-earth oxides are intentionally added, in any format, to the glass or glass raw materials during any of the processing steps leading to the formation of the glass article. It is to be understood that a glass composition or glass article that is at least substantially free of an alkaline-earth oxide may inadvertently contain small amounts of a alkaline-earth oxide (whether in elemental, ionic, or compound form) due to contamination or it may contain no amounts of that component.

The photochromic glasses generally include a glass matrix, comprising in weight percent (wt %) based on oxides: 48 wt %$\leq$SiO$_2$$\leq$58 wt %; 15 wt %$\leq$B$_2$O$_3$$\leq$21 wt %; 5 wt %$\leq$Al$_2$O$_3$$\leq$9 wt %; 2.5 wt %$\leq$ZrO$_2$$\leq$6.5 wt %; 2 wt %$\leq$Li$_2$O$\leq$4 wt %; 0 wt %$\leq$Na$_2$O$\leq$3 wt %; 3 wt %$\leq$K$_2$O$\leq$10 wt %; 0 wt %$\leq$MgO$\leq$2 wt %; 0 wt %$\leq$CaO$\leq$2 wt %; 0 wt %$\leq$SrO$\leq$2 wt %; 0 wt %$\leq$BaO$\leq$2 wt %; 0 wt %$\leq$TiO$_2$$\leq$2.5 wt %; 2 wt %$\leq$Nb$_2$O$_5$$\leq$4.5 wt %; and a plurality of photochromic agents, comprising in wt % with respect to the glass matrix: 0.100 wt %$\leq$Ag$\leq$0.250 wt %; 0.200 wt %$\leq$Cl$\leq$0.500 wt %; 0.0100 wt %$\leq$Br$\leq$0.300 wt %; and 0.0050 wt %$\leq$CuO$\leq$0.0110 wt %.

The plurality of photochromic agents can further include an optional reducing agent, which can be Sb$_2$O$_3$ and/or SnO$_2$, in an amount up to about 0.5 wt %.

The photochromic glasses are capable of exhibiting at least one of the following properties: a transmission in the clear state $T_0$>86%; transmission in the darkened state after a 15 minute exposure to a solar simulator at 22° C. ($T_{d15\_22C}$) <35%; transmission in the darkened state after 15 min exposure to solar simulator at 35° C. ($T_{d15\_35C}$)<45%; or fast fading characterized by a transmission $T_{f5}$ (5 min after UV extinction)>45%.

The ranges of glass constituents indicated immediately above were determined by practical glass-making considerations and their effects on both optical and physical properties (e.g., coefficient of thermal expansion and Littleton point).

These glasses can be prepared using existing melting techniques and can be molded into any desired shape using existing glass forming techniques.

The various embodiments of the present disclosure are further illustrated by the following non-limiting examples.

EXAMPLES

Example 1

Fabrication of Glass Compositions

A variety of glasses were prepared and compared to a glass composition having a rare earth element. The glasses were heat-treated in a lehr or a static furnace to develop photochromism. The glasses were subjected to a thermal treatment at temperatures of about 640 to about 670° C. for about 30 to about 45 minutes. The optical properties of these glasses were measured using a solar simulator.

The glass compositions and their physical attributes are shown in Table I, where Sample 1 is the rare earth element-containing sample.

TABLE I

Batched composition of various glasses

|  | 1 | 2 | 3 | 4 |
|---|---|---|---|---|
| SiO$_2$ | 55.03 | 55.56 | 55.56 | 55.56 |
| B$_2$O$_3$ | 18.03 | 16.30 | 16.30 | 16.30 |
| Al$_2$O$_3$ | 7.11 | 8.03 | 8.03 | 8.03 |
| ZrO$_2$ | 4.90 | 3.68 | 3.68 | 3.68 |
| Li$_2$O | 3.13 | 2.77 | 2.77 | 2.77 |
| Na$_2$O | 0.28 | 0.31 | 0.31 | 0.31 |
| K$_2$O | 8.12 | 8.92 | 8.92 | 8.92 |
| La$_2$O$_3$ | 3.40 | 0.00 | 0.00 | 0.00 |
| Nb$_2$O$_5$ | 0.00 | 3.71 | 3.71 | 3.71 |
| TiO$_2$ | 0.00 | 0.00 | 0.00 | 0.00 |
| Ag (batched) | — | 0.200 | 0.200 | 0.200 |
| Cl | — | 0.345 | 0.345 | 0.345 |
| Br | — | 0.170 | 0.170 | 0.170 |
| CuO | — | 0.0050 | 0.0070 | 0.0090 |
| Fusing ability | Yes | Yes | Yes | Yes |
| Refractive index | 1.523 | 1.522 | 1.522 | 1.522 |
| Solar simulator (2 mm) | | | | |
| T0 | 92.1 | 91.1 | 91.9 | 92.4 |
| Td15__22C | 18.9 | 19.7 | 16.6 | 19.7 |
| Td15__35C | 31.3 | 27.5 | 30.1 | 38.0 |
| Tf5 | 52.0 | 49.0 | 52.4 | 62.5 |
| F5 | 33.1 | 29.3 | 35.8 | 42.8 |
| x0 | 0.3146 | 0.3164 | 0.3162 | 0.3154 |
| y0 | 0.3338 | 0.3355 | 0.3354 | 0.3345 |
| x15 | 0.3166 | 0.3236 | 0.3211 | 0.3179 |
| y15 | 0.3296 | 0.3317 | 0.3265 | 0.3273 |
| x5 | 0.3282 | 0.3269 | 0.3263 | 0.3261 |
| y5 | 0.3356 | 0.3355 | 0.3350 | 0.3362 |

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A photochromic glass, comprising:
   a glass matrix that is at least substantially free of rare earth elements, comprising in weight percent (wt %) based on oxides:
   48 wt %$\leq$SiO$_2$$\leq$58 wt %;
   15 wt %$\leq$B$_2$O$_3$$\leq$21 wt %;
   5 wt %$\leq$Al$_2$O$_3$$\leq$9 wt %;
   2.5 wt %$\leq$ZrO$_2$$\leq$6.5 wt %;
   2 wt %$\leq$Li$_2$O$\leq$4 wt %;
   0 wt %$\leq$Na$_2$O$\leq$3 wt %;
   3 wt %$\leq$K$_2$O$\leq$10 wt %;
   0 wt %$\leq$MgO$\leq$2 wt %;
   0 wt %$\leq$CaO$\leq$2 wt %;
   0 wt %$\leq$SrO$\leq$2 wt %;
   0 wt %$\leq$BaO$\leq$2 wt %;
   0 wt %$\leq$TiO$_2$$\leq$2.5 wt %;
   2 wt %$\leq$Nb$_2$O$_5$$\leq$4.5 wt %; and
   a plurality of photochromic agents, comprising in weight percent (wt %) with respect to the glass matrix:
   0.100 wt %$\leq$Ag$\leq$0.250 wt %;
   0.200 wt %$\leq$Cl$\leq$0.500 wt %;
   0.0100 wt %$\leq$Br$\leq$0.300 wt %; and
   0.0050 wt %$\leq$CuO$\leq$0.0110 wt %.

2. The photochromic glass of claim 1, wherein the plurality of photochromic agents further comprise a reducing agent, which can be Sb$_2$O$_3$ and/or SnO$_2$, in an amount up to about 0.5 wt %.

3. The photochromic glass of claim 1, wherein the photochromic glass is at least substantially free of TiO$_2$.

4. The photochromic glass of claim 1, wherein the photochromic glass is at least substantially free of alkaline-earth oxides.

5. The photochromic glass of claim 1, wherein the photochromic glass is at least substantially free of $TiO_2$ and alkaline-earth oxides.

6. The photochromic glass of claim 1, wherein the photochromic glass exhibits at least one of the following properties:
   a transmission in the clear state $T_0 > 86\%$;
   transmission in the darkened state after a 15 minute exposure to a solar simulator at 22° C. $(T_{d15\_22C}) < 35\%$;
   transmission in the darkened state after a 15 minute exposure to a solar simulator at 35° C. $(T_{d15\_35C}) < 45\%$; or
   fast fading characterized by a transmission $T_{f5}$ (5 minutes after UV extinction) $> 45\%$.

7. A lens, comprising the photochromic glass of claim 1.

* * * * *